July 2, 1946.　　　　C. D. HOWARD　　　　2,403,221
WELDING APPARATUS
Filed May 7, 1941　　　　3 Sheets-Sheet 1

INVENTOR
Cecil D. Howard
ATTORNEYS.

July 2, 1946.
C. D. HOWARD
2,403,221
WELDING APPARATUS
Filed May 7, 1941
3 Sheets-Sheet 3
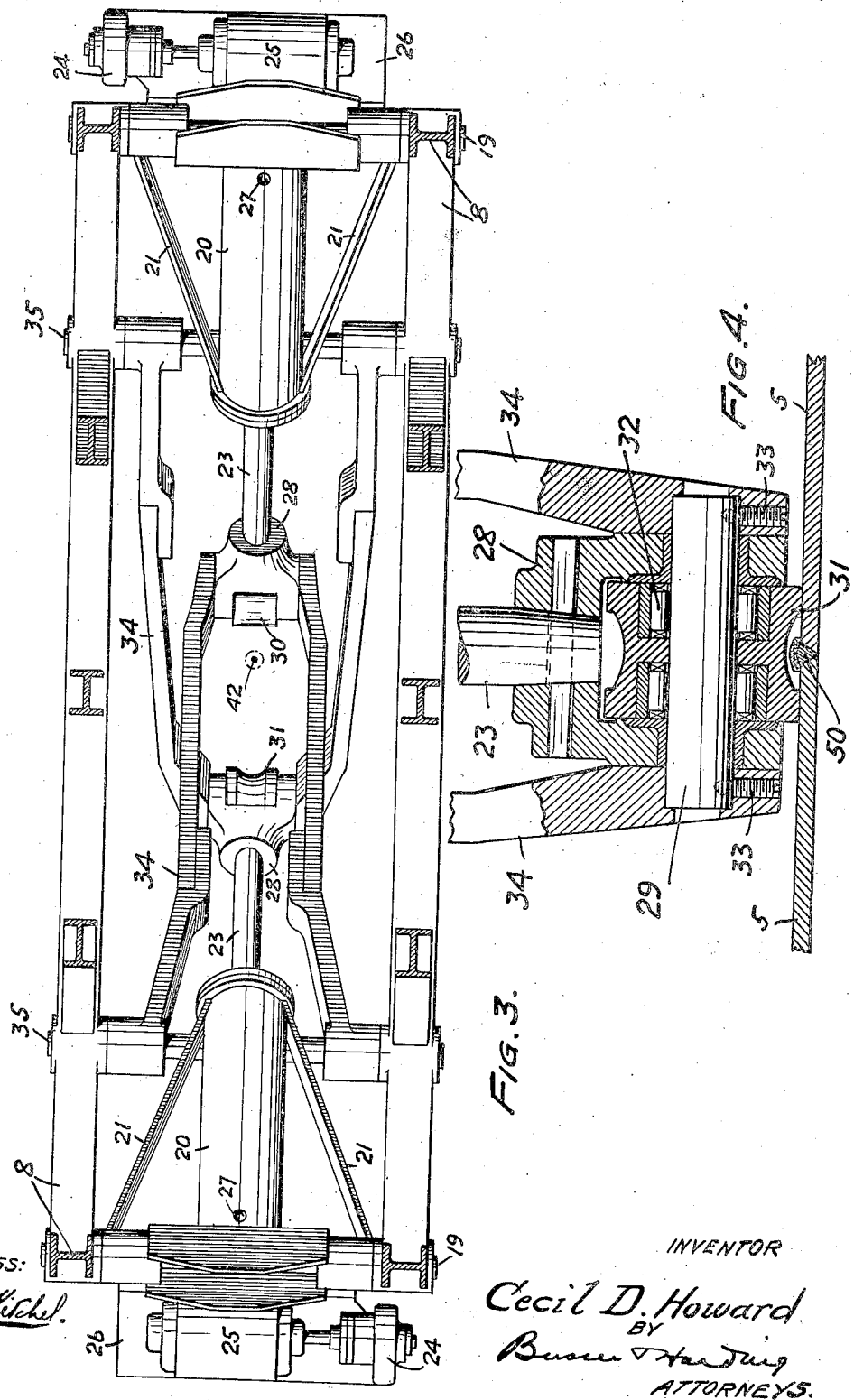
WITNESS:
INVENTOR
Cecil D. Howard
BY
ATTORNEYS.

Patented July 2, 1946

2,403,221

UNITED STATES PATENT OFFICE 2,403,221

WELDING APPARATUS

Cecil D. Howard, Swarthmore, Pa., assignor to Sun Shipbuilding & Dry Dock Company, Chester, Pa., a corporation of Pennsylvania Application May 7, 1941, Serial No. 392,237

5 Claims. (Cl. 113—59)

This invention relates to an improvement in welding apparatus and more particularly relates to an improvement in apparatus for effecting the butt-welding of plates.

As is well known, in the butt-welding of plates it is important that the edge portions of the plates be level and that warping from the welding heat be avoided.

Heretofore various means have been devised for flattening or leveling the edge portions of plates and to restrain them from warping from the welding heat. By way of example, individual power actuated clamping means, such as are shown in the United States Patent No. 2,176,664 to Burke, have been used.

The means heretofore used, where they have proved satisfactory for the purpose, have, however, generally required considerable manipulation and time for their adjustment prior to the actual welding operation and for their release on completion of the welding.

Now it is the object of this invention to provide means for flattening and restraining the edge portions of plates prior to and during butt-welding, which require a minimum of adjustment prior to the welding operation and which may be readily released on completion of the weld; and which, at the same time, will be simple in construction and highly efficient in operation for the purpose intended.

Having now indicated, in a general way, the nature and purpose of this invention, I will proceed to a detailed description of a preferred embodiment, all with reference to the accompanying drawings, in which:

Figure 3 is a cross-sectional view showing a detail of construction with the welding head and its accessories omitted.

Figure 4 is a view, partly in section, showing a detail of construction.

Figure 1:
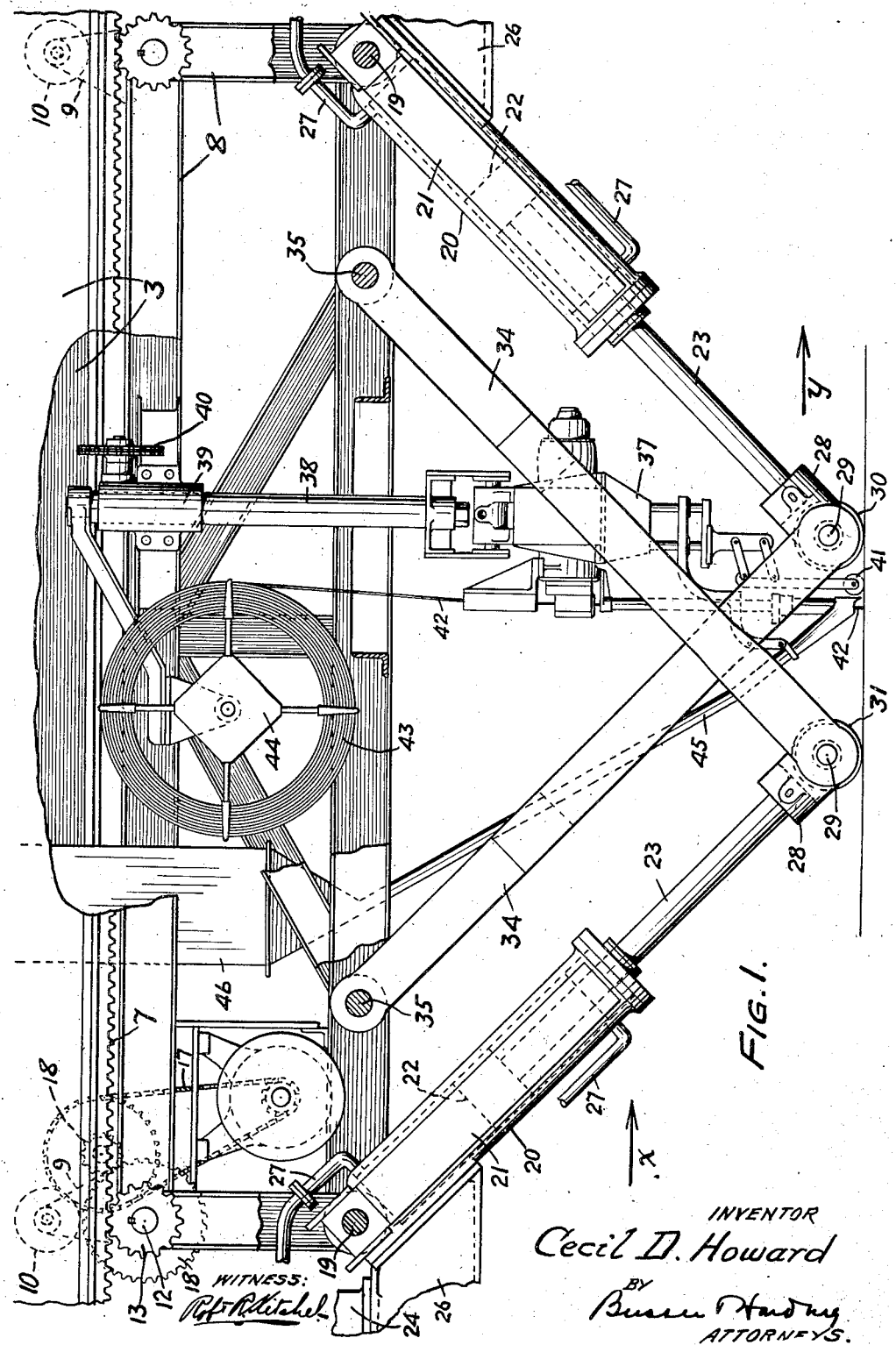
Figure 1 is a side view, partly in section, of welding apparatus according to this invention.

The apparatus according to this invention is supported from a framework comprising pairs of posts 1 extending vertically from suitable foundations and connected at their upper ends by cross members 2, which serve to support in spaced relation a pair of I beams 3, 3. A pair of posts 1 with cross members 2 are placed at opposite sides of a bed adapted for the support of plates to be welded. The bed will include, for example, spaced transversely extending supporting members 4, 4, for the support of the edge portions of a pair of plates 5, 5 to be butt-welded. The I beams supported from members 2 will extend transversely of the bed. Beneath each of the I beams 3, 3 is secured a rail 6 and a rack 7.

A carriage or trolley comprises the framework 8 from which, in vertical brackets 9, 9, are supported wheels 10, 10, which engage the lower flange of the I beams 3, 3 and serve to support the trolley. Bearings 11, 11 are mounted on the framework 8 at one end for the support of a shaft 12 on the ends of which are keyed pinion gears 13, 13, which engage with the racks 7, 7, and wheels 14, 14, one of which is flanged, are loosely mounted on the shaft and engage rails 6, 6.

A motor, as a reversible variable speed electric motor 15, is mounted in the framework 8 and is operably connected to a reduction gear 16 through sprockets connected by a chain 17. The reduction gear 16 is connected to the shaft 8 by gearing 18, 18, to the end that the trolley may be driven back and forth on I beams 3, 3 at desired speed. It will be noted that the weight of the trolley is supported by wheels 10, 10, bearing on I beams 3, 3, while upward pressure thereon will be taken up in I beams 3, 3 through the wheels 14, 14, one of which is flanged for guidance of the trolley at either end.

Supported on pivots 19, 19, extending transversely at the ends of the trolley are fluid power cylinders 20, 20, suitably braced from the pivots 19 by braces 21, 21, and provided with pistons 22, 22 connected to piston rods 23, 23.

The pistons in cylinders 20, 20 are adapted to be operated by fluid pressure, as, for example, oil under pressure, and to such end pumps 24, 24, driven by electric motors 25, 25, are mounted on fluid supply tanks 26, 26, in turn supported from the upper ends of the cylinders 20. The pumps draw fluid from the supply tank 26 and discharge through accumulators, not shown. Connections 27, for the passage of fluid under pressure from the accumulators to opposite ends of the cylinder are provided, it being noted that any suitable arrangement of valves, not shown, is provided to enable the application of pressure to upper or lower ends of the cylinders with relief of pressure to the supply tank from the opposite ends of the cylinders.

The piston rods 23, 23 are connected to yokes 28, 28 (see Figure 4), which carry pins 29, on which, between the arms of the yokes, are mounted rollers 30, 31, through the medium of roller bearings 32. The leading roller 30, Figures 1 and 3, is a plain roller, but the roller 31, which follows behind the welding point, is grooved to clear the weld, as shown in Figure 4.

Secured to the end portions of pins 29, 29, by means of set screws 33, 33, are the ends of levers 34, 34, the opposite ends of which are pivotally mounted on the framework or trolley 8 by means of pins 35, 35.

Figure 2:
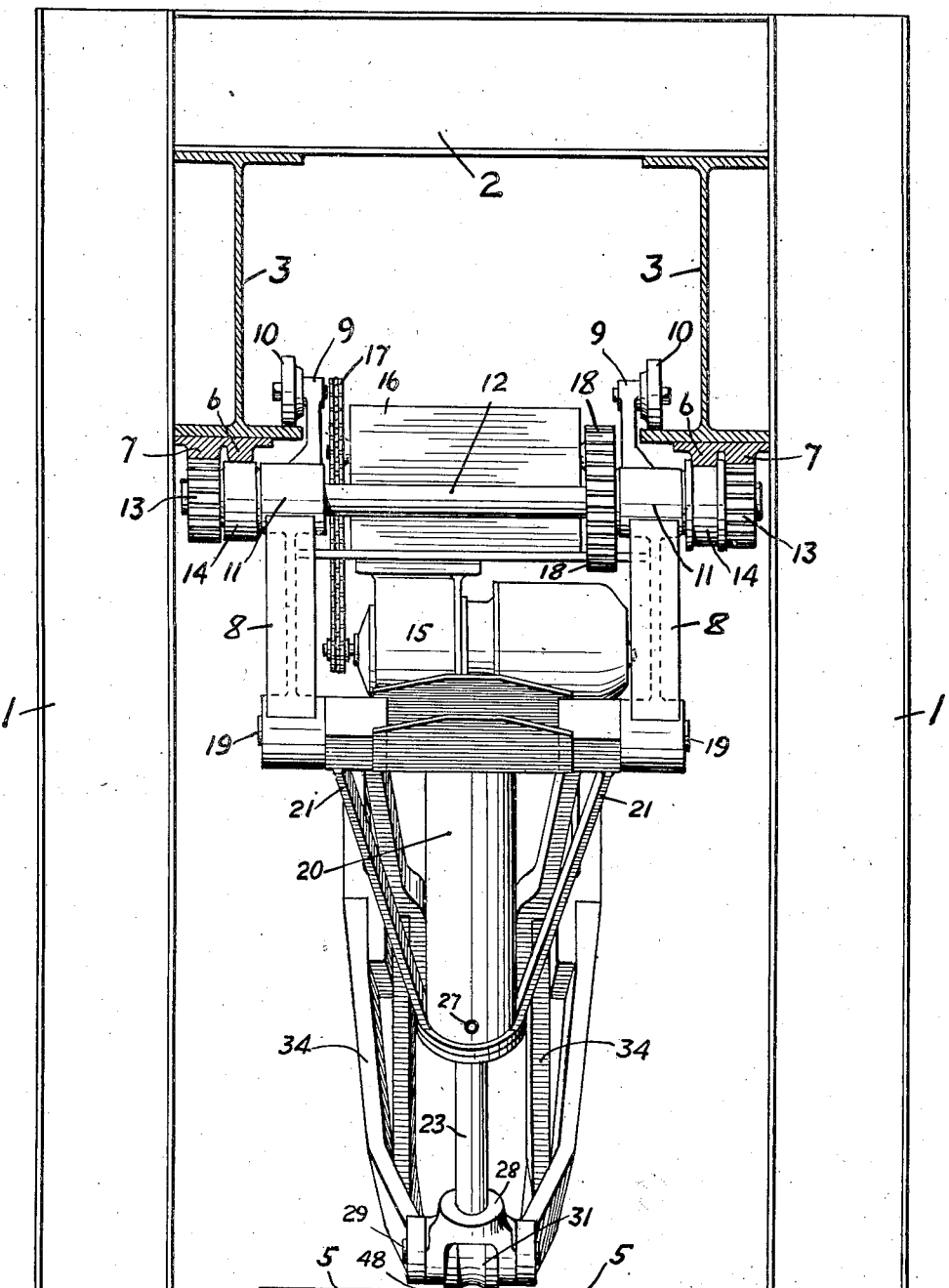
Figure 2 is an end view, partly in section, of the apparatus shown in Figure 1, looking in the direction of the arrow X, Figure 1.

The levers 34, 34, which may be in two sections abutted (as shown in Figures 2 and 3) and welded together, are arranged in pairs, each pair, in effect, forming a bifurcated lever and so formed and spaced that they cross, one pair passing between the other pair, and allowing clearance for passage of the welding head 37.

The welding head 37, which may be of any desired construction for effecting electric welding, is mounted on an adjustable mast 38 supported on the framework 8 through a bracket 39. The mast 38 is raised and lowered for adjustment of the welding head by means of gearing operated by a suitable motor through a chain passing over a chain pulley 40.

The welding head is provided with a guide wheel 41 and with means for leading the welding wire 42 to the welding point from a coil 43 on a reel 44, mounted on the mast 38, by means of bracket 49. A conduit 45 is provided for the delivery of flux to the welding point from a flux tank 46 mounted on the trolley.

The welding head is so placed that when adjusted to the work for welding, the weld will be effected closely behind the plain roller 30, see Figure 1, in which the rollers travel in the direction of the arrow y.

The edge portions of the plates to be butt-welded, as has been indicated, are supported on the supports 4, 4, between which is a trough, in the bottom of which is a hose 47 covered with a layer of flux 48. Inflation of the hose forces the flux into contact with the underside of plates along the line of weld, the hose being protected from heat by the layer of flux.

In the operation of the apparatus above described, the trolley or framework 8 is moved, by operation of the electric motor 15, to one side or the other of a bed upon which a pair of plates 5, 5, suitably beveled at their edges for butt-welding, are positioned. The plates will be positioned on the bed in the usual manner with their edges to be welded abutting and with their edge portions supported by the supports 4, 4, as shown in Figure 2.

Fluid pressure will then be applied, by operation of the pumps 24, to the upper ends of cylinders 20, provision being made for opening of the lower ends of cylinders 20 to the pressure fluid supply tanks 26, and pistons 22 will be forced downwardly causing the rollers 30, 31 to be forced down upon the abutted edge portions of the plates 5, 5, it being noted that, of course, the plates will be arranged upon the bed so that the rollers will overlap the abutting edges and bear upon the edge portions of the plates.

The levers 34 and the cylinders 20 and piston rods 23 will be desirably so arranged that when fluid pressure is applied to force the rollers 30, 31 on to the plates the rods and levers will make an angle of about 45° with the horizontal, thus effecting the greatest multiplication of the pressure applied to the cylinders 20 with respect to the plates, through the rollers. The welding head will then be adjusted by adjustment of the mast 38 and the welding operation will be commenced with supply of wire 42 and flux from the tank 46 through the conduit 45.

When the welding operation is started, the trolley will be set in operation, through the medium of motor 15, to move transversely of the plates along the line of weld. The speed of the trolley will be controlled through the reduction gearing 16, and variable speed motor 15.

Assuming, with reference to Figure 1, that the welding proceeds and the trolley moves in the direction shown by the arrow y, it will be noted that the welding will be accomplished between the rollers 30, 31. The plain roller 30 will press out any irregularities in the edge portions of the plates, thus insuring that the edge portions of the plates are level when welded, while the grooved roller 31 as well as the roller 30 will keep the edge portions of the plate from warping under welding heat. The provision of the groove in the roller 31 permits it to clear the weld 50.

On completion of the welding the pressure is relieved from the upper ends of the cylinders 20 and pressure is applied to the lower ends of the cylinders, causing the rollers to be raised away from the plates, it being noted that the cylinders 20 and the levers 34, which carry the rollers, are pivoted to the trolley or framework 8. The welding head is then raised by raising the mast 38 and the trolley returned to the opposite side of the bed for repetition of the welding operation. It will be noted that the rate of return of the trolley may be more rapid than its movement during the welding operation by suitable arrangement in the reduction gear.

It will be appreciated that any desired pressure may be put upon the plates through the rollers 30 and 31 by the application of any suitable fluid pressure in the cylinders 20. It will be noted that while the levers 34 and rods 23 will preferably be arranged to make an angle of about 45° with each other, and by such arrangement maximum pressure will be obtained upon the plates, they may be arranged at any desired operative angle.

It will be understood that it is not contemplated that this invention shall be limited by the above detailed disclosure of a preferred embodiment of this invention, given for purposes of illustration, since it is contemplated that various modifications may be made without departing from the scope of the invention as defined in the appended claims.

What I claim and desire to protect by Letters Patent is:

1. In welding apparatus for the butt-welding of plates, in combination, a support for the abutting edge portions of a pair of plates to be butt-welded, a trolley supported above said support, means for causing said trolley to travel longitudinally of the abutted edges of a pair of plates on said support, a pair of rollers positioned in spaced relation with their longitudinal axes at right angles to the direction of travel of said trolley, pivoted means connecting said rollers respectively with said trolley and means adapted to force said rollers respectively against the adjacent edge portions of a pair of abutted plates on said support in overlapped relation with respect to the abutted edges to clamp the adjacent edge portions of the plates to the support and a welding device supported from said trolley for operation between said rollers.

2. In welding apparatus for the butt-welding of plates, in combination, a support for the abutting edge portions of a pair of plates to be butt-welded, a trolley supported above said support, means for causing said trolley to travel longitudinally of the abutted edges of a pair of plates on said support, a roller positioned with its longitudinal axis at right angles to the direction of travel of said trolley, a power cylinder pivotally supported from said trolley, a piston in said cylinder, a piston rod connected to said roller, a lever pivotally supported from said trolley and connected to said roller, said cylinder and lever extending toward said roller in directions to form an acute angle and a welding device supported from said trolley for operation adjacent to said roller.

3. In welding apparatus for the butt-welding of plates, in combination, a support for the abutting edge portions of a pair of plates to be butt-welded, a trolley supported above said support, means for causing said trolley to travel longitudinally of the abutted edges of a pair of plates in said support, a pair of rollers positioned in spaced relation with their longitudinal axes at right angles to the direction of travel of said trolley, a pair of power cylinders pivotally connected to said trolley, pistons in said cylinders, piston rods connecting said rollers respectively with said pistons respectively, a pair of levers pivotally connected to said trolley and connected respectively to said rollers respectively, the piston rods and levers connected to said rollers respectively extending toward said rollers respectively in directions to form acute angles, and a welding device supported from said trolley for operation between said rollers.

4. In welding apparatus for the butt-welding of plates, in combination, a support for the abutting edge portions of a pair of plates to be butt-welded, a trolley supported above said support, means for causing said trolley to travel longitudinally of the abutted edges of a pair of plates on said support, a roller positioned with its longitudinal axis at right angles to the direction of travel of said trolley, a power cylinder pivotally supported from said trolley, a piston in said cylinder, a piston rod connected to said roller, a lever pivotally supported from said trolley and connected to said roller, said cylinder and lever extending toward said roller in directions to form an acute angle, a pump supported from said trolley, a source of fluid supported from said trolley and connected to said pump and means affording passages for fluid under pressure between said pump and the ends of said cylinder whereby said rollers may be moved toward and away from said support.

5. In welding apparatus for the butt-welding of plates, in combination, a support for the abutting edge portions of a pair of plates to be butt-welded, a trolley supported above said support, means for causing said trolley to travel longitudinally of the abutted edges of a pair of plates on said support, a pair of rollers, one of which is grooved between its ends the other being plain, positioned in spaced relation with their longitudinal axes at right angles to the direction of travel of said trolley, pivoted means connecting said rollers respectively with said trolley and adapted to force said rollers respectively against the edge portions of a pair of abutted plates on said support and a welding device supported from said trolley for operation between said rollers at a point adjacent to the plain roller.

CECIL D. HOWARD.